US011625373B2

(12) United States Patent
Smith, Jr. et al.

(10) Patent No.: US 11,625,373 B2
(45) Date of Patent: Apr. 11, 2023

(54) DETERMINING ADDITIONS, DELETIONS AND UPDATES TO DATABASE TABLES

(71) Applicant: International Business Machines Corporation, Armonk, NY (US)

(72) Inventors: Donnie Allen Smith, Jr., Raleigh, NC (US); Kenneth L. Greenlee, Raleigh, NC (US); Venkatapathi Rao Kaka, Guntur (IN); Sahil Arora, Hisar (IN); Mukesh Kumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 16/863,597

(22) Filed: Apr. 30, 2020

(65) Prior Publication Data

US 2021/0342324 A1 Nov. 4, 2021

(51) Int. Cl.
*G06F 16/21* (2019.01)
*G06F 16/2458* (2019.01)

(52) U.S. Cl.
CPC ........ *G06F 16/219* (2019.01); *G06F 16/2477* (2019.01)

(58) Field of Classification Search
CPC .... G06F 16/219; G06F 16/2477; G06F 16/17; G06F 16/2457
See application file for complete search history.

(56) References Cited

U.S. PATENT DOCUMENTS

| 5,187,750 | A  | * | 2/1993  | Behera      | G06Q 40/02   |
|-----------|----|---|---------|-------------|--------------|
|           |    |   |         |             | 382/140      |
| 6,330,568 | B1 | * | 12/2001 | Boothby     | G06F 16/275  |
| 6,654,746 | B1 |   | 11/2003 | Wong et al. |              |
| 7,657,574 | B2 |   | 2/2010  | Gupta et al.|              |
| 9,418,070 | B2 |   | 8/2016  | Laron       |              |
| 2002/0049764 | A1 | * | 4/2002 | Boothby  | G06F 16/10   |
| 2006/0271510 | A1 |   | 11/2006 | Harward et al. |         |
| 2008/0307011 | A1 | * | 12/2008 | Chen    | G06F 11/1469 |
| 2011/0314138 | A1 | * | 12/2011 | Kobayashi | G06F 11/0709 |
|           |    |   |         |             | 709/222      |
| 2015/0095298 | A1 |   | 4/2015 | Mann      |              |

(Continued)

FOREIGN PATENT DOCUMENTS

| CN | 1026629468 B | 2/2012  |
|----|--------------|---------|
| CN | 102662946 B  | 10/2015 |

(Continued)

*Primary Examiner* — Cam Y T Truong
(74) *Attorney, Agent, or Firm* — Scully, Scott, Murphy & Presser, P.C.

(57) ABSTRACT

A method, system and computer program product for determining changes to database tables. In an embodiment, the method comprises loading a first group of records in a first time period in a database; loading a second group of records in a second time period in the database; selecting one or more of the records in the database; and for each of the selected records, determining whether it was loaded into the database during the first time period or the second time period, and providing the each record with a specified designation based on the time period during which the each record was loaded into the database. In an embodiment, identified times when the records were loaded in the database are used to determine the time period during which the each record was loaded in the database.

19 Claims, 3 Drawing Sheets

(56) References Cited

U.S. PATENT DOCUMENTS

| | | | |
|---|---|---|---|
| 2015/0193526 A1 | 7/2015 | Gaur et al. | |
| 2017/0109391 A1* | 4/2017 | Rosen | G06F 16/285 |
| 2017/0286566 A1 | 10/2017 | Bornea et al. | |
| 2021/0224230 A1* | 7/2021 | Jones | G06F 16/185 |

FOREIGN PATENT DOCUMENTS

| | | |
|---|---|---|
| WO | WO201588483 A1 | 6/2015 |
| WO | WO201806304 A1 | 11/2018 |

* cited by examiner

DETERMINING ADDITIONS, DELETIONS AND UPDATES TO DATABASE TABLES

BACKGROUND

This invention generally relates to database tables, and more specifically, to determining additions, deletions and updates to schema-less database tables.

SUMMARY

According to an embodiment of the present invention, a method comprises loading a first group of records in a first time period in a database; loading a second group of records in a second time period in the database; selecting one or more of the records in the database; and for each of the selected records, determining whether it was loaded into the database during the first time period or the second time period, and providing the each record with a specified designation based on the time period during which the each record was loaded into the database.

In embodiments, the loading a first group of records in the database includes for each record of the first group of records, identifying a time when the each record was loaded in the database; the loading a second group of records in the database includes for each record of the second group of records, identifying a time when the each record was loaded in the database; and the determining whether the each selected record was loaded into the database during the first time period or the second time period, and providing the each record with a specified designation based on the time period during which the each record was loaded into the database includes using the identified time when the each record was loaded in the database to determine the time period during which the each record was loaded in the database.

In embodiments, each of the first and second time periods has a start time and an end time; the loading a first group of records in the database includes storing the start time and the end time of the first time period in a metadata table; and the loading a second group of records in the database includes storing the start time and the end time of the second time period in the metadata table.

In embodiments, each record of the first group of records has an associated identification; and each record of the second group of records has an associated identification.

In embodiments, the providing the each record with a specified designation based the time period during which the each record was loaded in the database includes providing the each record with a specified designation based on the time period during which the each record was loaded in the database and the associated identification of the each record.

In embodiments, the providing the each record with a specified designation based on the time period during which the each record was loaded in the database includes, when one record of the second group of records has a same associated identification as one record of the first group of records, designating said one record of the first group of records as deleted.

Embodiments of the invention use a combination of record versions timestamps and hash values to help consuming applications know what rows of a database have been added, updated or deleted.

Embodiments of the invention determine changes to a database table without having complete before and after snapshots of the data in order to make a comparison and without using additional tools.

DETAILED DESCRIPTION

Figure 1:
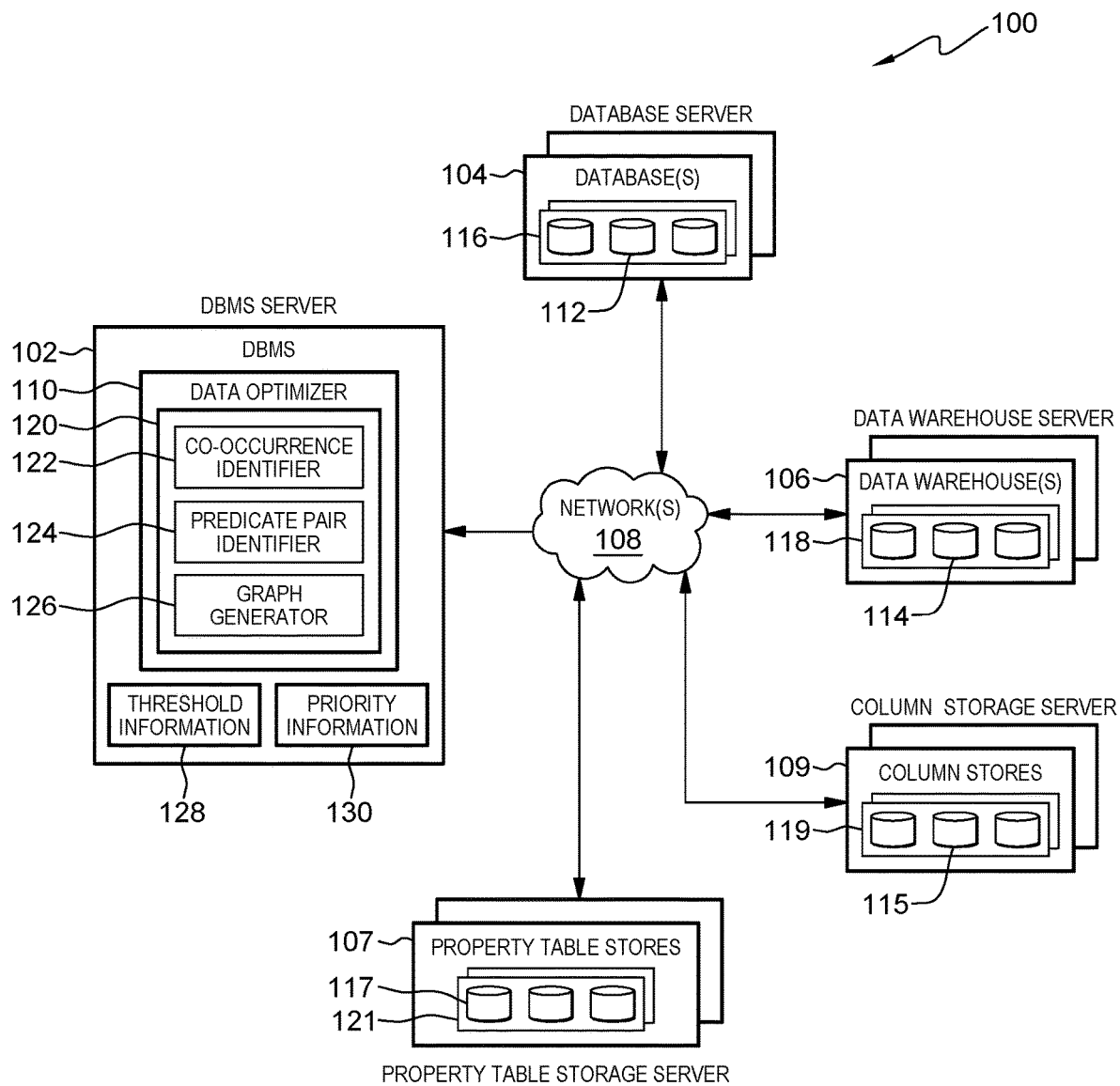
FIG. 1 is a block diagram illustrating one example of an operating environment according to one embodiment of the present invention.

FIG. 1 shows one example of an operating environment 100 applicable to various embodiments of the present invention. As shown, a database management system (DBMS) server 102 is communicatively coupled to one or more data storage servers 104, 106, 107, 109 via a network(s) 108. The network(s) 108, in one embodiment, is a wide area network, local area network, wired network, wireless network, and/or the like. The server 102, in one embodiment, comprises a DBMS 110. The data manager 110 accesses and manages data 112, 114, 115, 117 stored in one or more databases 116, data warehouses 118, columns stores 119, and/or property table stores 121 residing on the data storage servers 104, 106, 107, 109. It should be noted that the databases 116 can also reside within the data manager 110 as well.

The databases 116, data warehouses 118, column stores 119, and property table stores 121 each comprise objects (not shown), which can be physical or logical, such as (but not limited to) storage containers, table spaces, tables, indexes, and materialized views for managing the data 112, 114, 115, 117. The data 112, 114, 115, 117 in one embodiment, are unstructured data (also referred to herein as "schema-less data") that is stored within the databases 116, data warehouses 118, column stores 119, and property table stores 121 without a scheme (i.e., there is no predefined schema). In a schema-less system, one does not know what data is associated to a given information, and every row can have data in any number of columns of a non-predefined number of columns. Data 114 within a data warehouse 118 can also be considered unstructured or schema-less since a data warehouse combines disparate data from multiple databases.

It should be noted that embodiments of the present invention are not limited to any particular type of datasets. For example, the data may use tuples. Thus, for example, a tuple will contain a subject that is then interrelated to other components defined in that tuple. Other schema-less data representations include, for example, key/value databases.

Bulk loading of data from files into database tables presents problems for consuming applications that need to know what rows have been added, updated or deleted. This problem may be illustrated using the following example. Suppose a bulk load processor adds three records with ids=1111, 2222 and 3333 to a schema-less table. After the bulk load process completes, the table will have rows with row ids=1111, 2222 and 3333 stored in it, as illustrated below:

```
id = 1111
id = 2222
id = 3333
```

Now, suppose the bulk load processor loads data from a second file into the same table with ids=1111, 2222 and 4444. Upon completion, the table now has four rows with row ids=1111, 2222, 3333 and 4444, as illustrated below:

```
id = 1111
id = 2222
id = 3333
id = 4444
```

In this scenario, record 3333 represents a deleted record and record 4444 represents an addition.

If the bulk load process of subsequent files represents a replacement of the data stored in the table, consuming applications would not know which records are new and which records have been deleted.

Embodiments of this invention address this problem using a combination of record versions, timestamps, and hash values.

Figure 2:
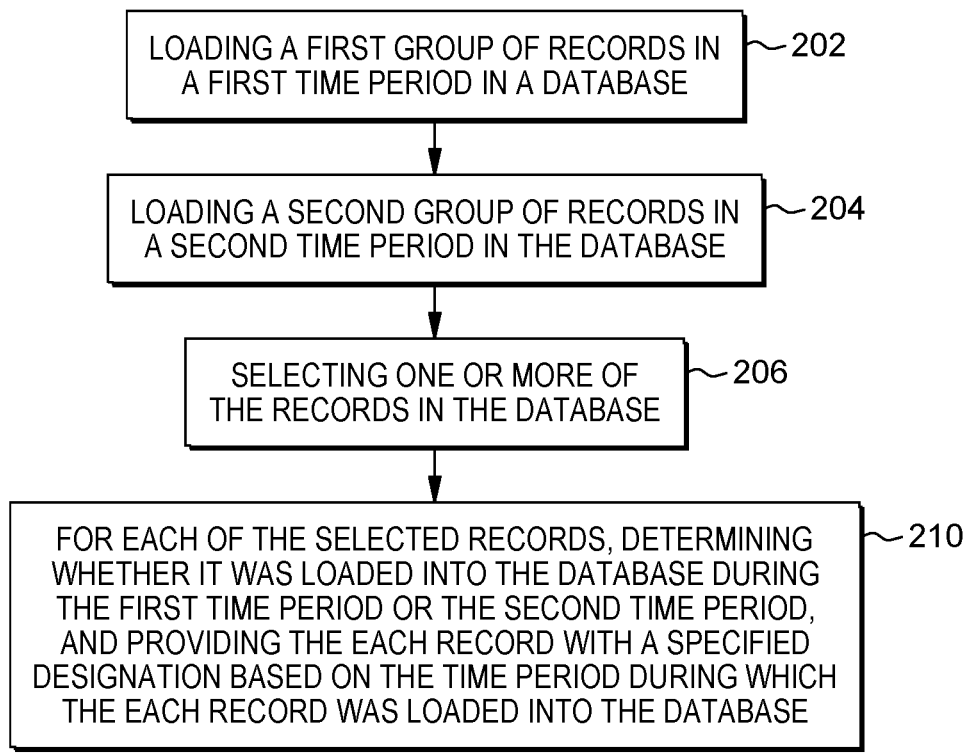
FIG. 2 is a flow chart of an example procedure in an embodiment of the invention.

With reference to FIG. 2, in accordance with an embodiment of the invention, at 202, a first group of records is loaded in a first time period in a database; and, at 204, a second group of records is loaded in a second time period in the database. At 206, one or more of the records in the database are selected; and at 210, for each of the selected records, whether it was loaded into the database during the first time period or the second time period is determined, and the each record is provided with a specified designation based on the time period during which the each record was loaded into the database.

In embodiments of the invention, the bulk load process writes a timestamp to a metadata table indicating when the bulk load process starts and completes, and the bulk load processor writes a hash value for reach record written to the database. The hash value for each record is determined based on the data in the record. Two records that have identical data get the same hash value, but if the data in the two records are not identical, the records will have different hash values. Additionally, the bulk load process writes a timestamp property for each record indicating when that record was written to the database. Thus, in the above-discussed scenario:

```
id = 1111, firstName = Sam, lastName = Smith,
hashValue = -1814840258, timestamp = 2019-12-03T16:59:51.000000
id = 2222, firstName = Tim, lastName = Johnson, hashValue =
2013490903, timestamp = 2019-12-03T16:59:52.000000
id = 3333, firstName = Sara, lastName = Collins,
hashValue = -3409834909, timestamp = 2019-12-03T16:59:53.000000.
```

In this example, the bulk load process writes out the bulk load start and end timestamp values of 2019-12-03T16:59:50.000000 and 2019-12-03T16:59:54.000000.

To determine if the rows represent additions or deletions, the application compares the record timestamps to determine if the record timestamp falls between the bulk load start and end timestamps. For row 3333, the timestamp falls outside these values and therefore the record at 3333 represents a delete. For row 4444, the timestamp falls between the bulk load start and end timestamps and therefore the record represents an addition.

Schema-less databases such as HBase also allow a user to create tables that can store multiple versions of records added to the table. Any suitable procedure may be used to identify loaded records as versions of each other. Multiple versions of records added to a database may be illustrated using the following example. An HBase table called "sample" supports two versions. Now, suppose a bulk load operation is performed of the following records into this table.

```
id = 1111, firstName = Sam, lastName = Smith
id = 1111, firstName = Sammy, lastName = Smith
```

After the second record is loaded, the sample table will have two versions of one row in it with the following values:

```
id = 1111
firstName = Sammy
lastName = Smith
```

If a consuming application performs a get on record id=1111, the consuming application will get the most recent record with id 1111, which has firstName=Sammy. The consuming application can, optionally, get all versions available for the record id 1111, in which case the consuming application will get two records, one with firstName=Sam, and one with firstName=Sammy. In this example, the consuming application would know that the record=1111 has been updated.

This scenario becomes more complicated when the row has hundreds of properties. The above-discussed hash values may be used by the consuming application to determine if two or more records with the same id are versions of each other.

As discussed above, in embodiments of the invention, the bulk load process writes a hash value for each record written to the database. Adding hash values to the records shown above, the bulk load process writes the following records to the database table:

```
id = 1111, firstName = Sam, lastName = Smith,
hashValue=-1814840258,
id = 1111, firstName = Sammy, lastName = Smith,
hashValue=-1825809546
```

In embodiments of the invention, to determine if a record in the sample has changed, the consuming applications fetches all versions of the record. If the number of versions returned equals two, then the record was bulk loaded more than once. To determine if the record changed, the consuming application compares the hash values for each version. If the two hash values are the same, the record has not changed and no action is required by the consuming application. If the two hash values are different, the record has been updated and the appropriate action can be taken by the consuming application.

Again, consider the example where records with ids=1111, 2222 and 3333 were initially bulk loaded and stored in the sample table, and a second bulk load was performed with records with ids=1111, 2222 and 4444.

When the consuming application reads all versions of the rows stored in the sample table, only one version of each record will be returned.

In embodiments of the invention, the consuming application checks to see if the record timestamp falls between the bulk load start and end timestamp values. In this scenario, all timestamp values fall between the bulk load start and end timestamp values. As a result, all of these records represent additions to the table.

After the second file is bulk loaded, the sample table and metadata table will have the following entries:

```
id = 1111, firstName = Sam, lastName = Smith,
hashValue = -1814840258, timestamp = 2019-12-03T17:00:22.000000
id = 2222, firstName = Tim, lastName = Johnson,
hashValue = 2013490903, timestamp = 2019-12-03T17:00:23.000000
id = 3333, firstName = Sara, lastName = Collins,
hashValue = -3409834909, timestamp = 2019-12-03T16:59:53.000000
id = 4444, firstName = Bobby, lastName = Parker,
hashValue = 2324599057, timestamp = 2019-12-03T17:00:24.000000
bulk load start timestamp = 2019-12-03T17:00:21.000000
bulk load end timestamp = 2019-12-03T17:00:25.000000.
```

When the consuming application reads all versions of the rows stored in the table, only one version will be returned to the consuming application for rows 3333 and 4444. To determine if the rows represent additions or deletions, the application compares the record timestamps to determine if the record timestamp falls between the bulk load start and end timestamps. For row 3333, the timestamp falls outside these values and therefore the record at 3333 represents a delete. For row 4444, the timestamp falls between the bulk load start and end timestamps and therefore the record represents an addition.

Figure 3:
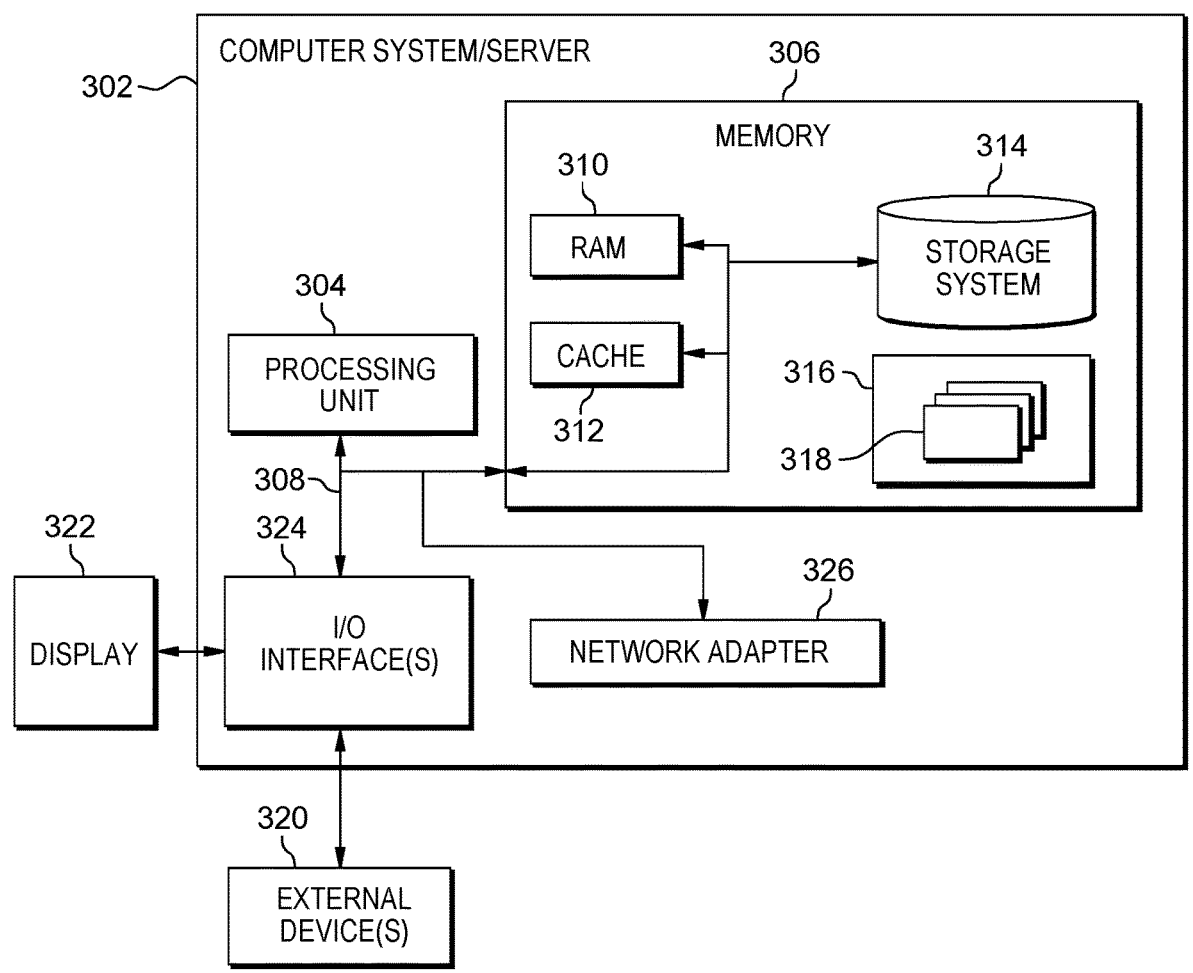
FIG. 3 is a block diagram illustrating a detailed view of an information processing system according to one embodiment of the present invention.

FIG. 3 shows a schematic of an exemplary information processing system 302 for use in embodiments of the present invention. Information processing system 302 is only one example of a suitable system and is not intended to limit the scope of use or functionality of embodiments of the present invention described above. The exemplary information processing system 302 is capable of implementing and/or performing any of the functionality set forth above. The information processing system 302 can be an information system communicatively coupled to a wireless communications network, a personal computer system, a server computer system, a thin client, a thick client, a hand-held or laptop device, a tablet computing device, a multiprocessor system, a microprocessor-based system, a set top box, a programmable consumer electronic, a network PC, a mini-computer system, a mainframe computer system, a distributed cloud computing system, or the like.

As illustrated in FIG. 3, the information processing system 302 is in the form of a general-purpose computing device. The components of the information processing system 302 can include, but are not limited to, one or more processors or processing units 304, a system memory 306, and a bus 308 that couples various system components including the system memory 306 to the processor 304. The bus 308 represents one or more of any of several types of bus structures, including a memory bus or memory controller, a peripheral bus, an accelerated graphics port, and a processor or local bus using any of a variety of bus architectures.

The information processing system 302 typically includes a variety of computer system readable media. Such media may be any available media that is accessible by the information processing system 302, and it includes both volatile and non-volatile media, removable and non-removable media. Although not shown, the system memory 306 can include the manager 110 of FIG. 1, the data optimizer 120 and its components, the threshold information 128 and the priority information 130. In another embodiment, the manager 110 and its components can reside within the processor 304, or be a separate hardware component. The system memory 306 can also include computer system readable media in the form of volatile memory, such as random access memory (RAM) 310 and/or cache memory 312.

The information processing system 302 can further include other removable/non-removable, volatile/non-volatile computer system storage media. By way of example only, a storage system 314 can be provided for reading from and writing to a non-removable or removable, non-volatile media such as one or more solid state disks and/or magnetic media (typically called a "hard drive"). In such instances, each can be connected to the bus 308 by one or more data media interfaces. The memory 306 can include at least one program product having a set of program modules that are configured to carry out the functions of an embodiment of the present invention.

Program/utility 316, having a set of program modules 318, may be stored in memory 1506 by way of example, and not limitation, as well as an operating system, one or more application programs, other program modules, and program data. Each of the operating system, one or more application programs, other program modules, and program data or some combination thereof, may include an implementation of a networking environment. Program modules 318 generally carry out the functions and/or methodologies of embodiments of the present invention.

The information processing system 302 can also communicate with one or more external devices 320 such as a keyboard, a pointing device, a display 322, etc.; one or more devices that enable a user to interact with the information processing system 302; and/or any devices (e.g., network card, modem, etc.) that enable computer system/server 302 to communicate with one or more other computing devices. Such communication can occur via 110 interfaces 324. In addition, the information processing system 302 can communicate with one or more networks such as a local area network (LAN), a general wide area network (WAN), and/or a public network (e.g., the Internet) via network adapter 326. As depicted, the network adapter 326 communicates with the other components of information processing system 302 via the bus 308. Other hardware and/or software components can also be used in conjunction with the information processing system 302.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of the invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and applications of the invention, and to enable others of ordinary skill in the art to understand the invention. The invention may be implemented in various embodiments with various modifications as are suited to a particular contemplated use.

The invention claimed is:

1. A computer-implemented method of tracking electronic records in an electronic database in one or more electronic data storage servers, the method comprising:
   loading, by a processor, a first group of electronic records in a first time period in the electronic database, wherein the first time period has a start time and an end time;
   loading, by a processor, a second group of electronic records in a second time period in the electronic database already loaded with the first group of electronic records, wherein the second time period has a start time and an end time, wherein the second time period is different from the first time period;
   selecting, after the loading the first group and the second group of electronic records into the electronic database, electronic records from the electronic database that contains the first group and the second group of electronic records, wherein the selecting, after the loading the first group and the second group of electronic records into the electronic database, the electronic records from the electronic database includes selecting one or more electronic records in the electronic database that was loaded as part of the second group of electronic records;

for each selected electronic record of the selected electronic records:

determining, by a processor, whether said each selected electronic record was loaded into the electronic database during the first time period or the second time period, using, by a processor, an electronic time identifier that indicates when each electronic record of the first group and second group of electronic records was loaded in the electronic database to determine whether the selected electronic record was loaded into the electronic database during the first time period or the second time period for each selected electronic record of the selected one or more electronic records of the second group of electronic records;

comparing, by a processor, the electronic time identifier that indicates when said each selected electronic record was loaded in the electronic database to the start time and end time of the second time period; and providing, by a processor, for each selected electronic record of the selected one or more electronic records a specified electronic designation based at least in part on the second time period during which the selected electronic record was loaded into the electronic database, wherein the providing the specified electronic designation includes providing for each selected electronic record of the second group of electronic records with one designation of a specified group of designations based on the comparison, wherein the specified group of designations consists of at least one of deleted, added, and a version of another electronic record; and providing, by a processor, for each selected electronic record the specified electronic designation based at least in part on the first time period during which each selected electronic record was loaded into the electronic database.

2. The method according to claim 1, wherein: the loading a first group of electronic records in the electronic database includes for each electronic record of the first group of electronic records, providing an electronic time identifier that indicates when each electronic record of the first group of electronic records was loaded in the electronic database; the loading a second group of electronic records in the electronic database includes for each electronic record of the second group of electronic records, providing an electronic time identifier that indicates when each electronic record of the second group of electronic records was loaded in the electronic database; and the determining whether each selected one or more electronic records was loaded into the electronic database during the first time period or the second time period includes using the provided electronic time identifier that indicates when each selected electronic record was loaded in the electronic database to determine whether each selected electronic record was loaded into the electronic database during the first time period or the second time period.

3. The method according to claim 2, the loading a first group of electronic records in the electronic database includes storing the start time and the end time of the first time period in an electronic metadata table; and the loading a second group of electronic records in the electronic database includes storing the start time and the end time of the second time period in the electronic metadata table.

4. The method according to claim 1, wherein: selecting, after loading the first group and the second group of electronic records into the electronic database, one or more of the electronic records from the electronic database includes selecting one or more electronic records in the electronic database that was loaded as part of the first group of electronic records by using the provided electronic time identifier that indicates when each selected electronic record was loaded in the electronic database to determine whether each selected electronic record was loaded into the electronic database during the first time period or the second time period includes for each electronic record of the selected electronic records of the first group of electronic records;

comparing the electronic time identifier that indicates when said each selected record of the selected one or more electronic records was loaded in the electronic database to the start and end times of the first time period; and the providing for each selected electronic record a specified electronic designation based at least in part on the first time period during which the selected electronic record was loaded into the electronic database includes providing for each selected electronic record of the first group of electronic records with one of the specified group of designations based on the comparison.

5. The method according to claim 1, wherein: each electronic record of the first group of electronic records has an associated identification; and each electronic record of the second group of electronic records has an associated identification.

6. The method according to claim 5, wherein the providing for each selected electronic record a specified electronic designation based at least in part on the time period during which each selected electronic record was loaded in the electronic database includes providing each selected electronic record with the specified electronic designation based on the time period during which each selected electronic record was loaded into the electronic database and an associated identification of the each electronic record.

7. The method according to claim 6, wherein the providing for each selected electronic record a specified electronic designation based at least in part on the first time period during which each selected electronic record was loaded into the electronic database includes, when one electronic record of the second group of electronic records has a same associated identification as one electronic record of the first group of electronic records, designating said one electronic record of the first group of electronic records as deleted.

8. The method according to claim 7, wherein the providing for each selected electronic record a specified electronic designation based at least in part on the time period during which each selected electronic record was loaded into the electronic database includes, for each electronic record of the second group of electronic records that has an associated identification different than associated identifiers of the first group of electronic records, designating said each electronic record of the second group of electronic records as an addition.

9. The method according to claim 7, wherein the providing for each selected electronic record a specified electronic designation based at least in part on the first time period during which each selected electronic record was loaded into the electronic database includes, when one electronic record of the second group of electronic records has a same associated identification as one electronic record of the first group of electronic records and given conditions are met, designating said one electronic record of the second group of electronic records as a version of the one electronic record of the first group of electronic records.

10. A system of tracking electronic records in an electronic database in one or more electronic data storage servers, the system comprising:
one or more processors; and a memory coupled to the one or more processors said one or more processors configured for:
loading a first group of electronic records in a first time period in the electronic database, wherein the first time period has a start time and an end time;
loading a second group of electronic records in a second time period in the electronic database already loaded with the first group of electronic records, wherein the second time period has a start time and an end time, wherein the second time period is different from the first time period;
selecting, after the loading the first group and the second group of electronic records into the electronic database, electronic records from the electronic database that contains the first group and the second group of electronic records,
wherein the selecting, after the loading the first group and the second group of electronic records into the electronic database, the electronic records from the electronic database includes selecting one or more electronic records in the electronic database that was loaded as part of the second group of electronic records;
for each selected electronic record of the selected electronic records:
determining whether said each selected electronic record was loaded into the electronic database during the first time period or the second time period,
using an electronic time identifier that indicates when each electronic record of the first group and second group of electronic records was loaded in the electronic database to determine whether the selected electronic record was loaded into the electronic database during the first time period or the second time period for each selected electronic record of the selected one or more electronic records of the second group of electronic records;
comparing the electronic time identifier that indicates when said each selected electronic record was loaded in the electronic database to the start time and end time of the second time period; and
providing for each selected electronic record of the selected one or more electronic records a specified electronic designation based at least in part on the second time period during which the selected electronic record was loaded into the electronic database,
wherein the providing the specified electronic designation includes providing for each selected electronic record of the second group of electronic records with one designation of a specified group of designations based on the comparison, wherein the specified group of designations consists of at least one of deleted, added, and a version of another electronic record; and
providing for each selected electronic record the specified electronic designation based at least in part on the first time period during which each selected electronic record was loaded into the electronic database.

11. The system according to claim 10, wherein: the loading a first group of electronic records in the electronic database includes for each electronic record of the first group of electronic records, providing an electronic time identifier that indicates when each electronic record of the first group of electronic records was loaded in the electronic database; the loading a second group of electronic records in the electronic database includes for each electronic record of the second group of electronic records, providing an electronic time identifier that indicates when each electronic record of the second group of electronic records was loaded in the electronic database;
and the determining whether each selected one or more electronic records was loaded into the electronic database during the first time period or the second time period includes using the provided electronic time identifier that indicates when each selected electronic record was loaded in the electronic database to determine whether each selected electronic record was loaded into the electronic database during the first time period or the second time period.

12. The system according to claim 11, wherein: the loading a first group of electronic records in the electronic database includes storing the start time and the end time of the first time period in an electronic metadata table; and the loading a second group of electronic records in the database includes storing the start time and the end time of the second time period in the electronic metadata table.

13. The system according to claim 10, wherein: each electronic record of the first group of electronic records has an associated identification; and each electronic record of the second group of electronic records has an associated identification.

14. The system according to claim 13, wherein the providing for each selected electronic record a specified electronic designation based at least in part on the time period during which each selected electronic record was loaded in the electronic database includes providing each selected electronic record with the specified electronic designation based on the time period during which each selected electronic record was loaded in the electronic database and an associated identification of the each electronic record.

15. A computer program product for tracking electronic records in an electronic database in one or more electronic data storage servers, the computer program product comprising a computer readable storage medium having program instructions embodied therewith, the program instructions executable by a processor to cause the processor to:
load a first group of electronic records in a first time period in the electronic database, wherein the first time period has a start time and an end time;
load a second group of electronic records in a second time period in the electronic database already loaded with the first group of electronic records, wherein the second time period has a start time and an end time, wherein the second time period is different from the first time period;
select, after the loading the first group and the second group of electronic records into the electronic database, electronic records from the electronic database that contains the first group and the second group of electronic records, wherein the selecting, after the loading the first group and the second group of electronic records into the electronic database, the electronic records from the electronic database includes selecting one or more electronic records in the electronic database that was loaded as part of the second group of electronic records;

for each selected electronic record of the selected electronic records:
  determining whether said each selected electronic record was loaded into the electronic database during the first time period or the second time period, using an electronic time identifier that indicates when each electronic record of the first group and second group of electronic records was loaded in the electronic database to determine whether the selected electronic record was loaded into the electronic database during the first time period or the second time period for each selected electronic record of the selected one or more electronic records of the second group of electronic records;
  comparing the electronic time identifier that indicates when said each selected electronic record was loaded in the electronic database to the start time and end time of the second time period; and
  providing for each selected electronic record of the selected one or more electronic records a specified electronic designation based at least in part on the second time period during which the selected electronic record was loaded into the electronic database, wherein the providing the specified electronic designation includes providing for each selected electronic record of the second group of electronic records with one designation of a specified group of designations based on the comparison, wherein the specified group of designations consists of at least one of deleted, added, and a version of another electronic record; and
  provide for each selected electronic record the specified electronic designation based at least in part on the first time period during which each selected electronic record was loaded into the electronic database.

16. The computer program product according to claim 15, wherein: the loading a first group of electronic records in the electronic database includes for each electronic record of the first group of electronic records, providing an electronic time identifier that indicates when record was loaded in the database; the loading a second group of electronic records in the electronic database includes for each electronic record of the second group of electronic records, providing an electronic time identifier that indicates when each electronic record of the second group of electronic records was loaded in the electronic database; and the determining whether each selected electronic record was loaded into the electronic database during the first time period or the second time period includes using the electronic time identifier that indicates when each selected electronic record was loaded in the electronic database to determine whether each selected electronic record was loaded into the electronic database during the first time period or the second time period.

17. The computer program product according to claim 16, wherein: the loading a first group of electronic records in the electronic database includes storing the start time and the end time of the first time period in an electronic metadata table; and
  the loading a second group of electronic records in the electronic database includes storing the start time and the end time of the second time period in the electronic metadata table.

18. The computer program product according to claim 15, wherein: each electronic record of the first group of electronic records has an associated identification; and each electronic record of the second group of electronic records has an associated identification.

19. The computer program product according to claim 18, wherein the providing for each selected electronic record a specified electronic designation based at least in part on the first time period during which each selected electronic record was loaded in the electronic database includes providing each selected electronic record with the specified electronic designation based on the first time period during which each selected electronic record was loaded in the electronic database and an associated identification of each electronic record.

\* \* \* \* \*